United States Patent [19]
Aldrovandi et al.

[11] Patent Number: 5,523,356
[45] Date of Patent: Jun. 4, 1996

[54] VULCANIZED POLYOLEFINIC PLASTOELASTOMER COMPOSITION AND A PROCESS FOR ITS PREPARATION

[75] Inventors: Enrico Aldrovandi; Luca Norfo; Patrizia Piancastelli, all of Bologna; Gian A. Saggese, Ferrara, all of Italy; Roger Lionnet, Brussels, Belgium

[73] Assignee: Enichem Elastomeri S.r.l., Milan, Italy

[21] Appl. No.: 521,331

[22] Filed: Aug. 30, 1995

[30] Foreign Application Priority Data

Aug. 30, 1994 [IT] Italy ..................... MI9401790

[51] Int. Cl.⁶ ........................................ C08L 9/00
[52] U.S. Cl. ..................... 525/237; 525/236; 524/526
[58] Field of Search ..................... 525/237, 236; 524/526

[56] References Cited

FOREIGN PATENT DOCUMENTS

| | | |
|---|---|---|
| 0287282 | 10/1988 | European Pat. Off. . |
| 2641518 | 3/1977 | Germany . |
| 2270915 | 3/1994 | United Kingdom . |
| WO90/14389 | 11/1990 | WIPO . |

*Primary Examiner*—Edward J. Cain
*Attorney, Agent, or Firm*—Oblon, Spivak, McClelland, Maier & Neustadt

[57] ABSTRACT

The invention provides plastoelastomer compositions obtained by dynamic vulcanization, in the presence of vulcanizing agents, of a polymeric mixture comprising:

a) 15–70 wt % of polypropylene,
b) 2–20 wt % of polyisobutene,
c) 20–70 wt % of ethylene/propylene/diene elastomer terpolymer (EPDM),
d) 0–35 wt % of ethylene/propylene elastomer copolymer (EPM),
e) 3–30 wt % of polybutadiene.

16 Claims, No Drawings

VULCANIZED POLYOLEFINIC PLASTOELASTOMER COMPOSITION AND A PROCESS FOR ITS PREPARATION

This invention relates to plastoelastomer polymeric compositions prepared by dynamic vulcanization, which present an interesting combination of elastic and thermoplastic properties.

The plastoelastomer mixtures of the present invention are obtained by dynamic vulcanization of a plastomer thermoplastic matrix consisting essentially of polypropylene, and an elastomer matrix comprising an ethylene/propylene/diene (EPDM) terpolymer, polybutadiene, polysobutene and optionally an ethylene/propylene (EPM) copolymer.

The polymeric compositions of the present invention form part of the so-called thermoplastic elastomers (TPE) and, in those cases in which the elastomer phase is vulcanized, (TPV). Recently however the name "dynamic vulcanized alloy" has been preferred. These compositions are generally obtained by mixing a vulcanized elastomer component with a thermoplastic component such that the elastomer part is crosslinked and intimately dispersed as a discrete phase within a continuous phase formed by the thermoplastic phase.

DVA is prepared by vulcanizing the elastomer component simultaneously with its mixing with the plastomer component at a temperature such as to enable the thermoplastic resins to achieve the plastic state.

The initial work on crosslinking olefinic thermoplastic compositions is described by Gassler and Haslett in U.S. Pat. No. 3,037,954. This document introduces the concept of "dynamic crosslinking" according to which by mixing the thermoplastic part with the elastomer part while simultaneously vulcanizing the elastomer phase, a final blend is obtained consisting of a microgel dispersion of crosslinked elastomer in a non-crosslinked matrix of a polymeric resin, this being known as dynamically vulcanized alloy or DVA.

U.S. Pat. No. 3,037,954 describes compositions comprising polypropylene and a rubber such as butyl rubber, chlorinated butyl rubber, polybutadiene, polychloroprene or polyisobutene. These compositions comprise from 50% to 95% of polypropylene and from 5% to 50% of rubber.

U.S. Pat. No. 3,758,643 and U.S. Pat. 3,086,558 describe olefinic thermoplastic elastomers comprising a thermoplastic polyolefinic resin and a partially vulcanized olefinic copolymer as the elastomer phase. These compositions can be easily reprocessed and have a good surface appearance, however their use is limited because of their unsatisfactory compression set value and insufficient operating temperature. The limits of these thermoplastics are a direct result of the partial vulcanization of the elastomer phase.

U.S. Pat. No. 4,104,210 and U.S. Pat. No. 4,130,535, by Coran et al., optimize the DVA preparation process to obtain for the first time complete vulcanization of the elastomer phase by dynamic vulcanization. In this manner the limitations on the physical mechanical properties are overcome to achieve a performance comparable to that of a rubber vulcanized by the normal crosslinking processes.

By analyzing the characteristics of TPVs obtained using different types of thermoplastics and elastomers, it subsequently emerged that the best compromise between the physical mechanical properties of the materials concerned is achieved by a blend of polypropylene with EP(D)M rubbers (A. Y. Coran in Thermoplastic Elastomers, N. R. Legge, G. Holden and H. E. Schroeder, publishers, New York 1987, page 133).

In U.S. Pat. No. 4,212,787 by Matsuda et al., a thermoplastic elastomer is prepared by partial dynamic vulcanization with peroxide of a blend containing determined quantities of an olefinic thermoplastic (polypropylene or polyethylene), an EPDM copolymer and a rubber not vulcanizable by peroxides, for example polyisobutene. This composition prepared by mixing together three types of polyolefinic polymers has a good surface appearance while at the same time providing sufficient heat resistance, tensile strength, flexibility and elastic return.

U.S. Pat. No. 4,202,801 by Petersen describes a blend obtained by partially vulcanizing dynamically a mixture formed from an olefinic thermoplastic resin, an EPM copolymer or EPDM terpolymer and an unsaturated olefinic rubber, ie a polymer obtained by polymerizing or copolymerizing monomers having conjugate double bonds (such as polyisoprene, polybutadiene or polychloroprene). This thermoplastic has good compression set and high tensile strength at high temperature.

U.S. Pat. No. 4,616,052 by Habibullah describes a thermoplastic elastomer containing as main component a polymeric blend of polypropylene and dynamically vulcanized EDPM terpolymer (from 65% to 90%), as second major component a rubber of the butyl rubber family (from 5% to 20%) and as plasticizer 1–20 wt % of polyisobutene. This composition has high creep resistance at high temperature but has the drawback that its preparation requires one more operating stage than the other plastoelastomer compositions.

According to the present invention, an olefinic thermoplastic elastomer composition has now been discovered, the elastomer part of which is virtually completely vulcanized (dynamically), which can be prepared in a single operating stage, to incorporate all the aforedescribed positive characteristics (good surface appearance, sufficient compression set, high heat resistance, excellent tear strength) without encountering the defects deriving from only partial vulcanization of the crosslinkable elastomer phase. In particular a composition has been discovered having a elastic return substantially better than that found in plastoelastomer compositions of the prior art while at the same time preserving all the typical properties of classical dynamically vulcanized thermoplastic polymeric elastomer alloys.

In accordance therewith the present invention provides a dynamically vulcanized plastoelastomer composition comprising:

a) 15–70 wt % and preferably 20–60 wt % of polypropylene or copolymers of propylene with other alpha olefins, the maximum alpha olefin quantity being 15% and preferably 10%, with a degree of vulcanization and/or grafting of 5–50% and preferably 10–40%, b) 2–20 wt % and preferably 4–15 wt % of polyisobutene, virtually totally non-vulcanized, c) 20–70 wt % and preferably 30–60 wt % of ethylene/propylene/diene elastomer terpolymer (EPDM), d) 0–35 wt % and preferably 3–30 wt % of ethylene/propylene elastomer copolymer (EPM), e) 3–30 wt % and preferably 5–20 wt % of polybutadiene, the percentage sum of the components c), d) and e) being vulcanized on an average to a degree exceeding 92% and preferably exceeding 95%, extender oils being possibly added to said composition in a quantity of 5–60 wt % and preferably 10–55 wt % on said composition.

The degree of vulcanization, this term also including any grafting, is determined by extraction with xylene as described in U.S. Pat. No. 4,963,612.

When speaking of a certain percentage of vulcanization, for example 15%, of a polymer species, this means that 15% of this species is insoluble in xylene at 135° C.

The term "virtually totally non-vulcanized" means a degree of vulcanization and/or grafting less than or equal to 5%.

As is well known, the performance level of vulcanized thermoplastic elastomers is strictly related, as already stated, to the morphology of the DVA and to the type of vulcanization of the dispersed elastomer phase.

It has now been found that by using polypropylene, polyisobutene, polybutadiene, an EPDM terpolymer and possibly an EPM copolymer of suitable characteristics and in the correct ratios, the best compromise is achieved between the degree of dispersion of the elastomer phase in the plastomer phase and the crosslinking of the elastomer phase. The mechanical and elastic properties of the thermoplastic elastomer are consequently optimized.

The aforedescribed composition can optionally also contain non-polymeric inorganic and/or organic products such as ZnO, $SiO_2$, $TiO_2$, $CaCO_3$, $BASO_4$, kaolin, carbon black, stabilizers, anti-ageing agents, catalysts, and vulcanization aids and accelerators.

As in the case of other plastoelastomer compositions, the composition of the present invention also essentially consists of an elastomer phase dispersed in a plastic phase functioning as the continuous phase, said elastomer phase consisting of particles of size less than 10 μm, with a minimum of 50% of the particles having a size of less than 5 μm.

In addition to the usual properties of known plastoelastomer compositions, the composition of the present invention has a rapid recovery rate of undergone deformation (as will be apparent from the experimental examples). This enables the composition of the present invention to be used with greater success than DVAs of the known art in applications such as:

motion transmission belts; in this respect the lower energy dissipation by internal friction means that the composition of the present invention has a greater life and effectiveness;

synthetic flooring, because of its the more rapid elastic return;

shoe soles, to limit energy dissipation;

nautical fenders, to absorb impulsive collisions;

other applications in which dynamic stresses must be quickly absorbed without large deformation.

With regard to the polymers contained in the composition of the present invention, the polypropylene used can be a homopolymer or a copolymer containing up to a maximum of 15% of other alpha-olefins, preferably up to a maximum of 10%.

The polyisobutene is preferably of high fluidity (viscosity from 2.6 to 3.8 dl/g).

The EPDM terpolymer contains 20–60 wt % and preferably 25–45 wt % of polypropylene, 40–75 wt % of ethylene and 2–11 wt % of dienes such as 1,3-butadiene, 1,4-hexadiene, norbornadiene, ethylidenenorbornene, or dicyclopentadiene.

The EPM copolymer can contain 20–60 wt % but preferably 20–45 wt % of propylene; in addition it usually has a weight average molecular weight exceeding $2 \times 10^5$, Mw/Mm<2.7 and r1×r2≦0.8.

The EPM copolymers and EPDM terpolymers are preferably prepared by polymerization using Ziegler-Natta catalysts; the relative methods are known in the art.

Examples of Ziegler-Natta catalysts are those prepared by contacting or precontacting compounds of a metal pertaining to group IVa, Va, VIa or VIIa of the periodic table of elements such as Ti, V, Zr or Cr, with organometallic compounds of a metal pertaining to group I, II, IIIA or IIIB of the periodic table of elements containing at least one metal-carbon bond, such as aluminium alkyls or partly halogenated or oxygenated aluminium alkyls.

The compounds of the elements of group IVa, Va, VIa or VIIa can be halides, alcoholates, arene derivatives or other organometallic derivatives either non-supported or supported on any known inert or non-inert substrate.

The polybutadiene used is preferably of high structural purity, ie having a cis content >95% and preferably >98%. The polybutadiene of high cis content is preferably prepared using Ziegler-Natta catalysts.

The extender oil can be aromatic, naphthenic or paraffinic, but preferably paraffinic.

The plastoelastomer composition of the present invention is prepared by mastication or other analogous operations in which energy is supplied by shearing forces, in the presence of the vulcanizing system (peroxide plus possible aids), of a polymeric mixture comprising:

a) 15–70 wt % and preferably 20–60 wt % of polypropylene, b) 2–20 wt % and preferably 4–15 wt % of polyisobutene, c) 20–70 wt % and preferably 30–60 wt % of ethylene/propylene/diene elastomer terpolymer (EPDM), d) 0–35 wt % and preferably 3–30 wt % of ethylene/propylene elastomer copolymer (EPM), e) 3–30 wt % and preferably 5–20 wt % of polybutadiene, the percentage sum of components a) to e) being 100.

Extender oils are preferably added to said composition in a quantity of 5–60 wt % and preferably 10–55 wt % on the sum of the polymers a) to e).

The characteristics of the polymers a) to e) are as aforestated.

Three typical compositions for vulcanization are the following formulations (A), (B) and (C).

Formulation A:

polypropylene: 25 wt %, polyisobutene: 6 wt %, ethylene/propylene/ethylidene-norbornene elastomer terpolymer (EPDM): 50 wt %, ethylene/propylene elastomer terpolymer (EPM): 13 wt %, polybutadiene: 6 wt %, extender oils: 42 wt % on the sum of the polymer components.

Formulation B:

polypropylene: 25 wt %, polyisobutene: 13 wt %, ethylene/propylene/ethylidene-norbornene elastomer terpolymer (EPDM): 37 wt %, ethylene/propylene elastomer terpolymer (EPM): 12 wt %, polybutadiene: 13 wt %, extender oils: 42 wt % on the sum of the polymer components.

Formulation C:

polypropylene: 35 wt %, polyisobutene: 6 wt %, ethylene/propylene/ethylidene-norbornene elastomer terpolymer (EPDM): 47 wt %, polybutadiene: 12 wt %, extender oils: 30 wt % on the sum of the polymer components.

The aforestated composition is subjected to dynamic vulcanization at a temperature such as to melt the polypropylene and at which vulcanization of at least 92% and preferably at least 95% of the initial EPR rubber and polybutadiene quantity occurs.

The extender oil can be added during mixing, together with any one of the oil-extended components, and/or can be added separately to the aforestated composition. The composition can contain up to a maximum of 4 wt % of polyethylene.

The vulcanizing agents used are peroxides, preferably characterised by a half life of 10–200 seconds within the vulcanization temperature range, ie 100°–240° C.

Examples of peroxides usable in said vulcanization process are dicumylperoxide, $\alpha,\alpha'$-bis(t-butylperoxy)-m- and/or -p-diisopropylbenzene, and 1,1-di-t-butylperoxide-3,5,5-trimethylcyclohexane; however any other organic peroxide with the described decomposition kinetics can be used.

The peroxide quantity used in the vulcanization is generally between 0.1 and 10 wt %, and preferably between 0.2 and 5 wt %, on the polymeric composition.

In addition to the vulcanizing agent, all aids of the known art able to perform the desired function, such as the furane derivatives 1,5-difurfuryl-1,4-pentadien-3-one and difurfuraldiazine, can be used. The said aids are used in a quantity of 5–60 wt % and preferably 10–30 wt % on the peroxide used.

A further aspect of the present invention is the process for preparing the vulcanized polyolefinic plastoelastomer composition of the present invention, which comprises the following stages:

1) preparing an intimate mixture comprising:

a) 15–70 wt % and preferably 20–60 wt % of polypropylene, b) 2–20 wt % and preferably 4–15 wt % of polyisobutene, c) 20–70 wt % and preferably 30–60 wt % of an ethylene/propylene/diene elastomer terpolymer (EPDM), d) 0–35 wt % and preferably 3–30 wt % of ethylene/propylene elastomer copolymer (EPM), e) 3–30 wt % and preferably 5–20 wt % of polybutadiene, the percentage sum of components a) to e) being 100, to said polymeric composition there being added:

f) extender oil in a quantity of 5–60 wt % and preferably 10–55 wt % on the polymer composition, g) an organic peroxide as vulcanizing agent in a quantity of 0.1–10 wt % on the sum of the copolymer (EPM), terpolymer (EPDM) and polybutadiene (c+d+e), h) a vulcanization aid in a quantity of 10–60 wt % on the peroxide (g), 2) heating the mixture, during mixing or mastication or subjection to other shearing forces, to a temperature of 160°–240° C. until the sum of the vulcanizable elastomer components present (c+d+e) has undergone more than 92% and preferably more than 95% crosslinking, and the polypropylene has undergone 5–50% and preferably 10–40% crosslinking.

The temperature of 160°–240° C. in stage 2) is necessary to completely melt the polypropylene.

Alternatively an oil-extended EPR terpolymer and/or copolymer can be used, in which case the oil of point f) can be reduced or eliminated.

Within the scope of the aforesaid process, products with different ratios of vulcanized part to non-vulcanized part after crosslinking can be obtained by varying the vulcanization conditions.

In particular, for example, the percentage of crosslinked or grafted polypropylene can be controlled by varying the peroxide and crosslinking aid concentrations.

The vulcanized fraction comprises the products deriving from the vulcanization of the elastomer components c), d), e) and part of the polypropylene, plus the possible products deriving from any grafting of the same components, vulcanized or not.

To correct the product hardness, variable quantities of polypropylene and/or further extender oil can be added after the dynamic vulcanization stage 2).

The following examples are provided for a better understanding of the present invention but are not limitative thereof.

EXAMPLES

In the following examples, the elastomers, the plastomers, the vulcanizing system components, the process additives and possible fillers are loaded in the required ratios into a suitable mixer.

This can be for example a Banbury internal mixer or other apparatus able to provide sufficient mastication at the required temperature.

The apparatus can be preheated to reduce the time required for attaining the desired temperature range. The preheating temperature must be below the decomposition temperature of the vulcanizing agent used. During mixing, the temperature is raised above the decomposition temperature of the vulcanizing agent.

Mixing is usually continued for a time sufficiently long to ensure decomposition of at least 95% of the vulcanizing system and complete mixing of the blend.

After the blend has been processed to the desired degree, other components can be added if they have not already been added. In this case mixing is continued until they have been completely mixed in.

The blend is then extracted from the mixer and, if desired, transferred to an open mixer to obtain sheets for possible granulation.

These can be used to form articles of suitable shape by extrusion, injection moulding or any other suitable manufacturing method.

The vulcanized polyolefinic thermoplastic elastomer compositions were evaluated using test pieces prepared by injection moulding, to obtain the typical chemical and physical characteristics of this type of product. To evaluate elastic return of the synthesized thermoplastic products, hysteresis cycles were effected and the energy dissipated and energy stored by the material during the loading-relaxation cycle were calculated as described in Rubber Chem. Technol., 21, 281 (1948). The ratio between the energy used to stretch the test piece to the predetermined length (100%) and the energy relative to the elastic return stage is strictly related to the elastomeric quality of the material.

The percentage of vulcanization of the crosslinkable elastomer components was evaluated by determining the insoluble residue after extraction in boiling xylene (135° C.) for 5 hours as described in U.S. Pat. No. 4,963,612.

The non-crosslinked fraction was calculated taking account of the inert fillers introduced and of the quantity of polymeric material soluble in boiling xylene.

All the tests were carried out using the aforestated general procedure.

The EPDM terpolymer used is characterised by a propylene content of 28 wt %, an ethylene content of 68% and an ethylidene-norbornene content of 4%, a Mooney viscosity ML(1+4)125 of 43 and a paraffinic oil content of 40%.

The EPM copolymer is characterised by a propylene content of 26%, r1×r2=0.8, a Mooney viscosity ML(1+4)125 of 72, Mw/Mn=2.6 and Mw=2×10$^5$.

The polypropylene contains about 4% of ethylene and about 6% of benzene, distributed within the polymeric chain with random order, and is characterised by a degree of fluidity (at 230° C. and 2160 grams, ASTM D 1238.L) of 6 dg/min, density 0.9 g/cm$^3$ and a melting point of 135° C.

The type of polyisobutene used is characterised by an intrinsic viscosity of 3.7 dl/g in diisobutylene and a density of 0.92 g/cm$^3$.

The butadiene rubber used is characterised by a Mooney viscosity ML(1+4)100 of 43 and a cis microstructure content > 98%.

The vulcanizing system used was Peroximon F40 with 1,5-difurfuryl- 1,4-pentadiene-3-one.

To carry out the tests shown in Table 1 the ingredients were fed into a Banbury internal mixer preheated to 110°–120° C.

Usually after a time of 3–4 minutes an energy peak is recorded related to the variation in viscosity of the mixture following vulcanization of the elastomer phase. Mixing is continued for a further 3–4 minutes.

The temperature change recorded during the test, measured by a thermocouple located on the wall of the mixing chamber, is usually 90° C.

In addition to the polymeric components and the vulcanizing system expressed in parts, all the compositions relative to the reported examples contain mineral fillers, anti-ageing agents and other process and product additives for a total of 60 phr (parts per 100 parts of rubber).

To make the data relative to the stored energy more comparable, all the plastoelastomer compositions of the reported examples have the same percentage of extender oil. In other words the variations due to the different quantities of oil-extended EPDM terpolymer were compensated by adding calculated quantities of pure oil. In addition all compositions have the same ratio of elastomer component to plastomer component.

Examples 5 and 6 form part of the present invention, whereas all the others, preceded by the letter C, are provided for purposes of comparison.

All the compositions relative to the reported examples showed ≧95% vulcanization of the crosslinkable elastomer fractions, with the exception of the composition C8, because in this case it was required to determine the characteristics on a thermoplastic mixture which was not completely vulcanized.

The data are shown in Tables 1 and 2. In Table 1 EPDM indicates the quantity of pure terpolymer (ie ignoring the quantity of oil in which it is normally diluted), PP indicates polypropylene, BR indicates polybutadiene, PIB indicates polyisobutene, vulc. ag. indicates the vulcanizing agent, vulc. aid indicates the vulcanization aid, par. oil indicates paraffinic oil (meaning the pure paraffinic oil plus the oil making up the EPDM-in-oil solution), and % pl/el indicates the plastomer composition as wt % of the elastomer composition.

In Table 2, Strength indicates tensile strength in MPa, 100% Mod indicates 100% modulus, 200% Mod indicates 200% modulus, Elong. indicates ultimate elongation. Hard. indicates hardness (Shore A), Tear indicates tear strength in kg/cm, Tens. set indicates % tensile set at 75, Comp. set indicates % compression set after 22 h at 100° C., and Stored en. indicates % of stored energy.

EXAMPLES 1C AND 2C.

In Examples 1C and 2C, two thermoplastic elastomer compositions were prepared by the aforesaid operating method, adding (to EPM+EPDM+PP) 10 and 20 phr of cis-polybutadiene respectively (see Table 1).

With regard to the composition of the product after vulcanization, the composition of Example 1C (the percentages relate to the total polymeric composition, hence 100% means the sum of both xylene-soluble and insoluble polymers) is as follows:

a) the residue insoluble in xylene at 135° C. consists of vulcanized (EPM+EPDM+polybutadiene (PB))=72%, polypropylene (PP)=4%;

b) the part soluble in xylene at 135° C. consists of polypropylene =21%, non-vulcanized (EPM+EPDM+PB)=3%.

The % vulcanization of the vulcanizable elastomers (EPM+EPDM+PB) is 96% and the final product contains 42% (the sum of the polymers being 100%) of extender oil.

With regard to the composition of Example 2C:

a) the residue insoluble in xylene at 135° C. consists of vulcanized (EPM+EPDM+PB)=74%, polypropylene= 6%;

b) the soluble part consists of PP=18%, non-vulcanized (EPM+EPDM+PB)=4%.

The % vulcanization of the vulcanizable elastomers (EPM+EPDM+PB) is 98% and the final product contains 41% of extender oil. Comparing the stored energy values (see Table 2) for Examples 1C and 2C with that of composition C7 prepared using as elastomer only the rubbers EPM and EPDM, the improving influence of polybutadiene on elastic return is clear.

In this respect, the stored energy passes successively from 30.8 to 32.8 and to 34.7%.

EXAMPLES 3C AND 4C

Examples 3C and 4C repeat the composition of Examples 1 and 2, but the polybutadiene is replaced by polyisobutene (PIB).

With regard to the composition of Example 3C:

a) the residue insoluble in xylene at 135° C. consists of vulcanized (EPM+EPDM+PB)=65%, polypropylene= 5%;

b) the soluble part consists of PP=20%, non-vulcanized (EPM+EPDM+PB)=4%, polyisobutene=7%.

The % vulcanization of the vulcanizable elastomers (EPM+EPDM+PB) is 95% and the final product contains 42% of extender oil.

With regard to the composition of Example 4C:

a) the residue insoluble in xylene at 135° C. consists of vulcanized (EPM+EPDM+PB)=59%, polypropylene= 4%;

b) the soluble part consists of PP=21%, non-vulcanized (EPM+EPDM+PB)=3%, polyisobutene=13%.

The % vulcanization of the vulcanizable elastomers (EPM+EPDM+PB) is 95% and the final product contains 42% of extender oil.

Comparing the stored energy values for these examples (see Table 2) with that of composition C7 prepared using as elastomer only the rubbers EPM and EPDM, it can be seen that by limiting the polyisobutene quantity to 10 phr there is an increase in stored energy, whereas on reaching 20 phr this value decreases.

This variation is probably due to the fact that beyond 10 phr of polyisobutene the positive effect of this component is influenced negatively by the reduction in the quantity of rubber vulcanized.

EXAMPLES 5 AND 6

Examples 5 and 6 consist of vulcanized thermoplastic mixtures prepared using both polybutadiene and polyisoprene simultaneously. Specifically, in Example 5, 10 phr of each component were used whereas in Example 6 this quantity was 20 phr.

With regard to the composition of Example 5:
a) the residue insoluble in xylene at 135° C. consists of vulcanized (EPM+EPDM+PB)=66%, polypropylene= 5%;
b) the soluble part consists of PP=21%, non-vulcanized (EPM+EPDM+PB)=3%, polyisobutene=6%.

The % vulcanization of the vulcanizable elastomers (EPM+EPDM+PB) is 96% and the final product contains 41% of extender oil.

With regard to the composition of Example 6:
a) the residue insoluble in xylene at 135° C. consists of vulcanized (EPM+EPDM+PB)=61%, polypropylene= 6%;
b) the soluble part consists of PP=19%, non-vulcanized (EPM+EPDM+PB)=2%, polyisobutene=12%.

The % vulcanization of the vulcanizable elastomers (EPM+EPDM+PB) is 96% and the final product contains 41% of extender oil.

Analyzing the stored energy of the compositions it can be seen that in Example 5 a further improvement is obtained over the preceding examples.

In particular, comparing Example 5 with the preparation C7 in which both polybutadiene and polyisobutene are absent, the stored energy is 36.3% against the base value 30.8%.

Compared with Example 5, the composition of Example 6 has a significantly lower stored energy value, the quantity of EPM and EPDM rubbers being evidently small compared with the overall elastomer fraction.

COMPARATIVE EXAMPLES C7 AND C8

In the composition C7 the only elastomer component is EPM and EPDM rubber.

The composition C8 was prepared for the purpose of verifying the influence of the degree of crosslinking of vulcanizable rubbers.

Specifically, using the already described preparation method, a composition C8 was prepared analogous to the composition 5 in all components except in the concentration of the vulcanizing system.

With regard to the composition of Example 7C:
a) the residue insoluble in xylene at 135° C. consists of vulcanized (EPM+EPDM+PB)=73%, polypropylene= 5%;
b) the soluble part consists of PP=20%, non-vulcanized (EPM+EPDM+PB)=3%, polyisobutene=3%.

The % vulcanization of the vulcanizable elastomers (EPM+EPDM+PB) is 96% and the final product contains 42% of extender oil.

With regard to the composition of Example 8C:
a) the residue insoluble in xylene at 135° C. consists of vulcanized (EPM+EPDM+PB)=61%, polypropylene= 3%;
b) the soluble part consists of PP=22%, non-vulcanized (EPM+EPDM+PB)=9%, PIB=6%.

The % vulcanization of the vulcanizable elastomers (EPM+EPDM+PB) is 89% and the final product contains 41% of extender oil.

Comparing the stored energy of the composition C8, ie 26.7%, with that of the completely vulcanized composition 5, ie 36.3%, the fundamental influence of this parameter (ie the degree of vulcanization) on the elastomer characteristics of the material is evident.

TABLE 1

|           | C1  | C2  | C3  | C4  | 5   | 6   | C7  | C8  |
|-----------|-----|-----|-----|-----|-----|-----|-----|-----|
| EPDM      | 91  | 80  | 91  | 80  | 80  | 61  | 101 | 80  |
| EPM       | 20  | 20  | 20  | 20  | 20  | 20  | 20  | 20  |
| PP        | 40  | 40  | 40  | 40  | 40  | 40  | 40  | 40  |
| BR        | 10  | 20  | —   | —   | 10  | 20  | —   | 10  |
| PIB       | —   | —   | 10  | 10  | 10  | 20  | —   | 10  |
| Vulc. ag. | 3.5 | 3.5 | 3.5 | 3.5 | 3.5 | 3.5 | 3.5 | 2.7 |
| Vulc. aid | 1   | 1   | 1   | 1   | 1   | 1   | 1   | 0.8 |
| Par. oil  | 67  | 67  | 67  | 67  | 67  | 67  | 67  | 67  |
| % pl/el   | 25  | 25  | 25  | 25  | 25  | 25  | 25  | 25  |

TABLE 2

|            | C1   | C2   | C3   | C4   | 5    | 6    | C7   | C8   |
|------------|------|------|------|------|------|------|------|------|
| Strength   | 4.4  | 4.5  | 4.2  | 3.9  | 4.6  | 3.9  | 4.3  | 3.2  |
| 100% Mod.  | 3.1  | 3.0  | 2.7  | 2.4  | 3.5  | 2.8  | 3.2  | 1.8  |
| 200% Mod.  | 4.3  | 4.4  | 3.9  | 3.4  | 4.4  | 3.8  | 4.3  | 2.6  |
| Elong.     | 216  | 212  | 242  | 242  | 212  | 225  | 216  | 297  |
| Hard.      | 66   | 65   | 64   | 64   | 64   | 64   | 64   | 64   |
| Tear       | 24.0 | 22.4 | 22.0 | 20.2 | 24.0 | 20.1 | 22.6 | 17.0 |
| Tens. set  | 8    | 8    | 8    | 8    | 8    | 8    | 8    | 12   |
| Comp. set  | 41   | 43   | 40   | 41   | 39   | 45   | 38   | 56   |
| Stored en. | 32.8 | 35.0 | 34.0 | 33.1 | 36.3 | 32.0 | 30.8 | 26.7 |

To demonstrate the temperature resistance of the compositions of the present invention, the products of Examples 5 and 6 were subjected to 5 processing cycles, ie article preparation and subsequent recycling with consequent reprocessing at a temperature higher than its melting point.

Example 5: Shore A 64–66, tensile strength 4.6–4.4, ultimate elongation 212–205, tear strength 24–26, tension set 8–10, compression set 39–41.

Example 6: Shore A 64–65, tensile strength 3.9–3.8 ultimate elongation 225–219, tear strength 20.1–21.2, tension set 8–9.5, compression set 45–46.

The aforesaid variations in properties are at the limit of significance, and are therefore in line with those encountered in similar products of the prior art.

We claim:
1. A dynamically vulcanized plastoelastomer composition comprising:
   a) 15–70 wt % of polypropylene or copolymers of propylene with other alpha olefins, the maximum alpha olefin quantity being 15%, with a degree of vulcanization and/or grafting of 5–50%,
   b) 2–20 wt % of polyisobutene, virtually totally non-vulcanized,
   c) 20–70 wt % of ethylene/propylene/diene elastomer terpolymer (EPDM),
   d) 0–35 wt % of ethylene/propylene elastomer copolymer (EPM), e) 3–30 wt % of polybutadiene, the sum of the components c), d) and e) being vulcanized on an average to a degree exceeding 92%, the percentage sum of components a) to e) being 100, extender oils being possibly added to said composition in a quantity of 5–60 wt % on said composition.

2. A dynamically vulcanized plastoelastomer composition as claimed in claim 1, comprising:
   a) 20–60 wt % of polypropylene or copolymers of propylene with other alpha olefins, the maximum alpha olefin quantity being 10%, with a degree of vulcanization and/or grafting of 10–40%,
   b) 4–15 wt % of polyisobutene, virtually totally non-vulcanized,
   c) 30–60 wt % of ethylene/propylene/diene elastomer terpolymer (EPDM),
   d) 3–30 wt % of ethylene/propylene elastomer copolymer (EPM),
   e) 5–20 wt % of polybutadiene, the sum of the components c), d) and e) being vulcanized on an average to a degree exceeding 95%, the percentage sum of compositions a) to e) being 100, extender oils being possibly added to said composition in a quantity of 10–55 wt % on said composition.

3. A composition as claimed in claim 2, wherein the polypropylene contains 4% of ethylene and 6% of butene.

4. A composition as claimed in claim 1, wherein the polybutadiene has a cis content exceeding 95%.

5. A composition as claimed in claim 4, wherein the polybutadiene has a cis content exceeding 98%.

6. A composition as claimed in claim 1, wherein the EPDM terpolymer contains 20–60 wt % of propylene, 40–75 wt % of ethylene and 2–11 wt % of dienes.

7. A composition as claimed in claim 6, wherein the EPDM terpolymer contains 25–45 wt % of propylene.

8. A composition as claimed in claim 1, wherein the EPM copolymer contains 20–60 wt % of propylene.

9. A composition as claimed in Claim 8, wherein the EPM copolymer contains 20–45% of propylene.

10. A polymeric mixture to be subjected to vulcanization which, in addition to fillers, extender oils, vulcanizing agents and vulcanization aids, comprises:
    a) 15–70 wt % of polypropylene,
    b) 2–20 wt % of polyisobutene,
    c) 20–70 wt % of ethylene/propylene/diene elastomer terpolymer (EPDM),
    d) 0–35 wt % of ethylene/propylene elastomer copolymer (EPM),
    e) 3–30 wt % of polybutadiene, the percentage sum of components a) to e) being 100.

11. A polymeric mixture as claimed in claim 10, comprising:
    a) 20–60 wt % of polypropylene,
    b) 4–15 wt % of polyisobutene,
    c) 30–60 wt % of ethylene/propylene/diene elastomer terpolymer (EPDM),
    d) 3–30 wt % of ethylene/propylene elastomer copolymer (EPM),
    e) 5–20 wt % of polybutadiene, the percentage sum of components a) to e) being 100.

12. A polymeric mixture as claimed in claim 11, comprising:
    a) 25 wt % of polypropylene,
    b) 6 wt % of polyisobutene,
    c) 50 wt % of ethylene/propylene/ethylidene-norbornene elastomer terpolymer (EPDM),
    d) 13 wt % of ethylene/propylene elastomer copolymer (EPM);
    e) 6 wt % of polybutadiene.

13. A polymeric mixture as claimed in claim 11, comprising:
    a) 25 wt % of polypropylene,
    b) 13 wt % of polyisobutene,
    c) 37 wt % of ethylene/propylene/ethylidene-norbornene elastomer terpolymer (EPDM),
    d) 12 wt % of ethylene/propylene elastomer copolymer (EPM);
    e) 6 wt % of polybutadiene.

14. A polymeric mixture as claimed in claim 11, comprising:
    a) 35 wt % of polypropylene,
    b) 6 wt % of polyisobutene,
    c) 47 wt % of ethylene/propylene/ethylidene-norbornene elastomer terpolymer (EPDM),
    d) 12 wt % of polybutadiene.

15. A process for preparing vulcanized plastoelastomer compositions, comprising the following stages:
    A) preparing an intimate polymeric mixture comprising:
    a) 15–70 wt % of polypropylene,
    b) 2–20 wt % of polyisobutene,
    c) 20–70 wt % of an ethylene/propylene/diene elastomer terpolymer (EPDM),
    d) 0–35 wt % of an ethylene/propylene elastomer copolymer (EPM),
    e) 3–30 wt % of polybutadiene, the percentage sum of components a) to e) being 100, to said polymeric composition there being added:
    f) extender oil in a quantity of 5–60 wt % on the polymer composition,
    g) an organic peroxide as vulcanizing agent in a quantity of 0.1–10 wt % on the sum of the copolymer (EPM), terpolymer (EPDM) and polybutadiene (c+d+e),
    h) a vulcanization aid in a quantity of 10–60 wt % on the peroxide (g),
    B) heating the mixture obtained in stage A), during mixing or mastication or subjection to other shearing forces, to a temperature of 160°–240° C. until the sum of the vulcanizable elastomer components present (c+d+e) has undergone more than 92% crosslinking, and the polypropylene has undergone 5–50% crosslinking.

16. A process as claimed in claim 15 for preparing vulcanized plastoelastomer compositions, comprising the following stages:
    A) preparing an intimate polymeric mixture comprising:
    a) 20–60 wt % of polypropylene,
    b) 4–15 wt % of polyisobutene,
    c) 30–60 wt % of an ethylene/propylene/diene elastomer terpolymer (EPDM),
    d) 3–30 wt % of ethylene/propylene elastomer copolymer (EPM),
    e) 5–20 wt % of polybutadiene, the percentage sum of components a) to e) being 100, to said polymeric composition there being added:
    f) extender oil in a quantity of 10–55 wt % on the polymer composition, g) an organic peroxide as vulcanizing agent in a quantity of 0.1–10 wt % on the sum of the copolymer (EPM), terpolymer (EPDM) and polybutadiene (c+d+e), h) a vulcanization aid in a quantity of 10–60 wt % on the peroxide (g), B) heating the mixture obtained in stage A), during mixing or mastication or subjection to other shearing forces, to a temperature of 160°–240° C. until the sum of the vulcanizable elastomer components present (c+d+e) has undergone more than 95% crosslinking, and the polypropylene has undergone 10–40% crosslinking.

* * * * *